I. H. SPENCER.
VACUUM GAGE.
APPLICATION FILED MAY 16, 1913.
1,199,216.
Patented Sept. 26, 1916.
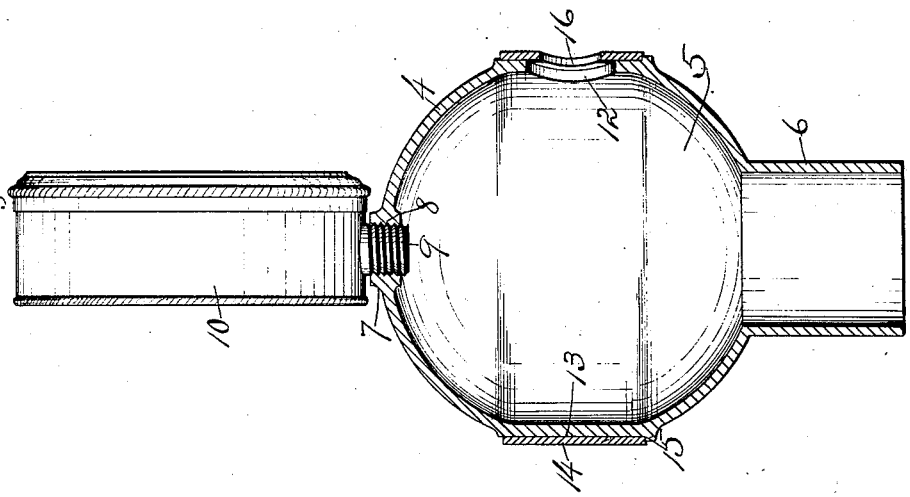
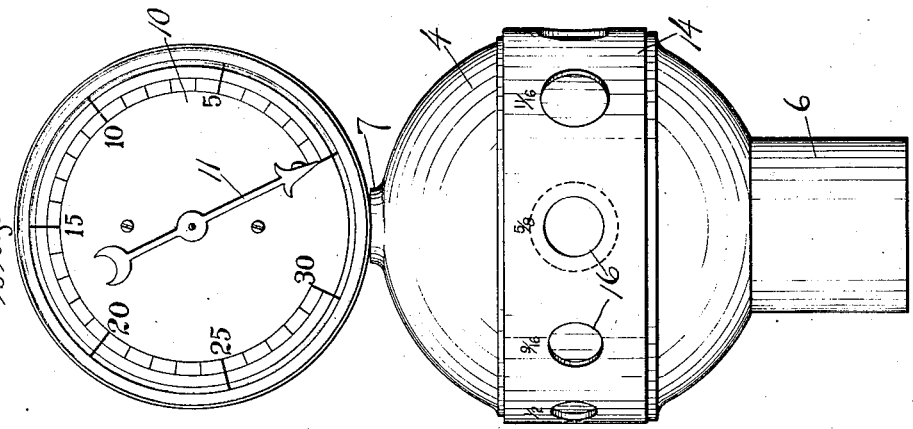
WITNESSES:
INVENTOR.
Ira H. Spencer,
BY
Arthur B. Jenkins
ATTORNEY.

UNITED STATES PATENT OFFICE.

IRA H. SPENCER, OF WEST HARTFORD, CONNECTICUT, ASSIGNOR TO THE SPENCER TURBINE CLEANER COMPANY, OF HARTFORD, CONNECTICUT, A CORPORATION OF CONNECTICUT.

VACUUM-GAGE.

1,199,216.  Specification of Letters Patent.  Patented Sept. 26, 1916.

Application filed May 16, 1913. Serial No. 768,031.

*To all whom it may concern:*

Be it known that I, IRA H. SPENCER, a citizen of the United States, and a resident of West Hartford, in the county of Hartford and State of Connecticut, have invented a new and Improved Vacuum-Gage, of which the following is a specification.

My invention relates to the class of devices employed for measuring the amount of vacuum that may exist in certain places, and an object of my invention, among others, is to provide a device of this class that shall be particularly accurate in denoting the vacuum that may exist under varying circumstances.

One form of device embodying my invention, and in the construction and use of which the objects herein set out, as well as others, may be attained, is illustrated in the accompanying drawings in which—

Figure 1 is a view in side elevation of a gage embodying my invention. Fig. 2 is a view in central vertical section through the body of the device.

My improved gage is shown as particularly adapted for use in determining the vacuum or pressure that may exist or will be produced at the end of a line of hose, pipe or the like, of any size under constant conditions as to the vacuum producing means or force with which such pipe may be connected and for which purpose it is particularly adapted, it being especially formed for insertion in the end of a hose or like part adapted to be connected with the vacuum apparatus, although it may be shaped and adapted for use in connection with any special device.

In the accompanying drawings the numeral 4 denotes the head of my improved gage that is preferably in the general form of a sphere, this head being hollow and forming a vacuum chamber 5. A neck 6 projects from one side of the head and a hub 7 is formed at the opposite side within which hub an opening 8, preferably threaded, is made for the reception of the stem 9 of a registering member 10. This registering member may be of any suitable form and construction, as shown herein it being a gage constructed and operating in a well known manner, and a full description of which is therefore omitted, it being sufficient to state that it embodies a pointer 11 operating in connection with a graduated circle in a manner common to devices of this class.

My improved device is especially intended for use in determining the vacuum that will be produced by a device under varying conditions, especially as to openings in tools, size of hose &c.

In devices heretofore constructed and embodying a passage of substantially uniform area in cross section, it has been found that the amount of vacuum will not be accurately denoted under some conditions as to size of openings through which the air passes. For instance while the device may be adjusted to accurately determine the amount of vacuum existing when the air is passing through an opening of a given size, upon varying the size of this opening the accuracy of the device will be affected. In constructing my improved device to overcome these defects I form the neck 6 of a size to fit within the end of a pipe or hose, and on this neck I form the head 4 containing the vacuum chamber 5 of an area in cross section substantially in excess of that of the passage through the neck 6. In that form of the device herein illustrated an inlet opening 12 is formed through the wall of the head 4, preferably at a point located at right angles to the axis of the neck 6, this opening being of a size equal to or greater than that of the largest opening in connection with which the device is intended to be used. That part of the head in which this opening is located is substantially of cylindrical shape, to provide a seat 13 for a gate 14, this cylindrical shaped part also having a shoulder 15 against which the edge of the gate rests. The gate 14 is in the form of a ring and is rotatably mounted on the seat 13 within which the opening 12 is formed. A number of openings 16 of predetermined and varying sizes are formed through the gate 14 in position to register with the opening 12 when the gate is rotated on its seat.

By providing the device with the vacuum chamber of a substantially increased area over that of the passage through which the air travels an enlarged space is afforded in which defective conditions may be neutralized so that the indicator attached to this chamber will accurately indicate the amount of vacuum existing in this chamber, irrespective of the size of the opening in the gate 14 that may be in register with the opening 12, whereas, without this chamber of increased area, the accuracy with which the vacuum will be indicated by the gage will vary from accurate indications under some conditions to inaccurate indications of various degrees under other conditions depending upon size of the openings through which air may travel at the time.

I claim—

1. An indicator including a head having a chamber therein, the said chamber being free of internal obstructions, a neck for attachment of said head to a tube, said neck projecting from one side of said head and with an opening therethrough and through said wall of a cross-sectional area less than that of said chamber, said chamber also having another opening through said wall, means for varying the size of said other opening to areas of definite dimensions to correspond to the effective inlet areas of different tools usable with said tube, and a gage secured to the head to be operated by the pressure within the chamber.

2. An indicator including a head having a wall of a single thickness forming a chamber therein, the said chamber being free of internal obstructions, a neck for attachment of said head to a tube, said neck projecting from one side of said head and with an opening therethrough and through said wall, a gage secured to the head to be operated by pressure within said chamber, a gate mounted upon said head, one of said parts having an opening and the other of said parts having openings of various sizes to correspond with the effective inlet areas of the mouths of different tools usable with said tube, said parts being relatively adjustable whereby the single opening in one part may be brought into register with any one of the openings in the other part.

3. An indicator including a head having a wall of a single thickness forming a chamber therein and with an inlet opening through the wall of said chamber, the said chamber being free of internal obstructions, a neck for attachment of said head to a tube, said neck projecting from one side of said head and with an opening therethrough and through said wall, a gage secured to the head to be operated by pressure within said chamber, and a gate mounted upon the head and having a number of openings of various sizes to correspond with the effective inlet areas of the mouths of different tools usable with said tube, said openings being positioned to be brought into register successively with said inlet opening.

4. An indicator including a head having a wall of a single thickness forming a chamber therein, the said chamber being free of internal obstructions, and with an inlet opening to said chamber, a neck for attachment of said head to a tube, said neck projecting from one side of said head and having an opening therethrough and through said wall of a cross-sectional area less than that of said chamber, a gage secured to the head to be operated by pressure therein, and a ring constituting a gate mounted upon a bearing surface on said head and having openings of various sizes to correspond with the effective inlet areas of the mouths of different tools usable with said tube, said openings being positioned to be brought into register successively with said inlet opening.

5. An indicator including a head having a wall of a single thickness forming a chamber therein, the said chamber being free of internal obstructions, and with an inlet opening through said wall to said chamber, said head having a bearing surface extending therearound and with a shoulder located at one edge of said bearing surface, a ring mounted on said bearing surface and having openings of various sizes to correspond with the effective inlet areas of mouths of different tools usable with said tube, said openings being positioned to be brought into register with said inlet opening, an outlet opening for said head, and a vacuum gage associated with said head.

6. An indicator including a head formed as a shell and having a chamber therein of spherical form, the said chamber being free of internal obstructions, a neck for attachment of said head to a tube, said neck projecting from one side of said head and with an opening therethrough and through said shell of less cross-sectional area than said chamber, a gage secured to the head on the opposite side thereof from said neck, said head having an inlet opening through its wall in a plane substantially at right angles to a plane extending through said neck and gage, and a gate of ring form surrounding the body between the neck and gage and having openings of various sizes to correspond with the effective inlet areas of the mouths of different tools usable with said tube, said openings being positioned to be brought into register successively with said inlet opening.

IRA H. SPENCER.

Witnesses:
F. N. COOKE,
S. E. PHILLIPS.